April 18, 1967     R. K. SCHULER ETAL     3,315,122
AUTOMATIC HEADLAMP CONTROL SYSTEM Filed Dec. 31, 1963     3 Sheets-Sheet 1

INVENTORS
Robert K. Schuler,
BY Charles W. Miller, &
Eugene W. Brock
Hugh L. Fisher
ATTORNEY INVENTORS
Robert K. Schuler,
BY Charles W. Miller, &
Eugene W. Brock Hugh L. Fisher
ATTORNEY INVENTORS
Robert K. Schuler,
Charles W. Miller, &
Eugene W. Brock
BY
Hugh A. Fisher
ATTORNEY

United States Patent Office 3,315,122
Patented Apr. 18, 1967

3,315,122
AUTOMATIC HEADLAMP CONTROL SYSTEM
Robert K. Schuler, Charles W. Miller, and Eugene W. Brock, all of Anderson, Ind., assignors to General Motors Corporation, Detroit, Mich., a corporation of Delaware
Filed Dec. 31, 1963, Ser. No. 344,800
7 Claims. (Cl. 315—83)

This invention relates to light responsive control systems and more particularly to automatic control systems for vehicle headlights.

Automatic headlamp control systems which have acquired a degree of acceptability, such as those shown in the patents to Onksen, Jr., et al. 2,762,930 and Martin et al. 3,026,446, generally include a phototube assembly and a control assembly. The phototube assembly usually comprises a photocell and a preamplifier tube mounted in a housing positioned in the vehicle behind the windshield. A condensing lens is positioned in the housing to receive light from approaching vehicles and focus the light on the photocell. The control assembly usually includes a relay which is energized through a current amplifier in response to the amount of light impinging on the photocell. In addition the control assembly includes a sensitivity switching arrangement which may be adjusted to provide a predetermined dim and hold sensitivity for the system. The phototube assembly also includes a driver sensitivity control which consists of a rheostat located in the cathode circuit of the preamplifier tube which may be adjusted by the driver to change the overall senstivity of the system.

One of the disadvantages of the prior art systems is that the dim and hold sensitivity adjustment must be set for the particular phototube assembly used in each individual system. This is due primarily to the fact that different photocells will respond differently to a light source of a given intensity. Moreover, should the phototube assembly require adjustment subsequent to installation, complicated procedures and additional equipment are required for properly aligning the phototube assembly and for testing for the proper senstivity. Furthermore, the prior art driver sensitivity control which varies the resistance in the cathode circuit of the preamplifier tube provides only a limited range of adjustment and therefore does not always satisfy the individual requirement of the driver.

The disadvantages associated with the automatic headlamp dimming systems as described above are obviated by the present invention wherein the phototube assembly is mounted in the left front fender of the motor vehicle in a pocket behind and above the headlamp assembly. The phototube assembly is thus in a position to be more responsive to the tail lamps of vehicles which are being approached and from the headlamps of oncoming vehicles. The light is gathered by a lens at the front of the fender and travels through a light tight enclosure to a second lens mounted in front of the photocell. The phototube assembly contains a bulb for testing sensitivity and a level for setting correct vertical position. The dim and hold sensitivity adjusting unit is located in the phototube assembly and may therefore be set relative to a master control assembly thus eliminating the necessity of matching components in each individual system. A driver sensitivity control assembly is provided which not only increases the range of adjustment of overall system sensitivity but provides a means of compensating for any errors due to slight misadjustment of the phototube or control assemblies or errors due to stackup of tolerances in the various components.

A more complete understanding of the present invention may be had from the following detailed description which should be read in conjunction with the drawings in which.

Figure 1:
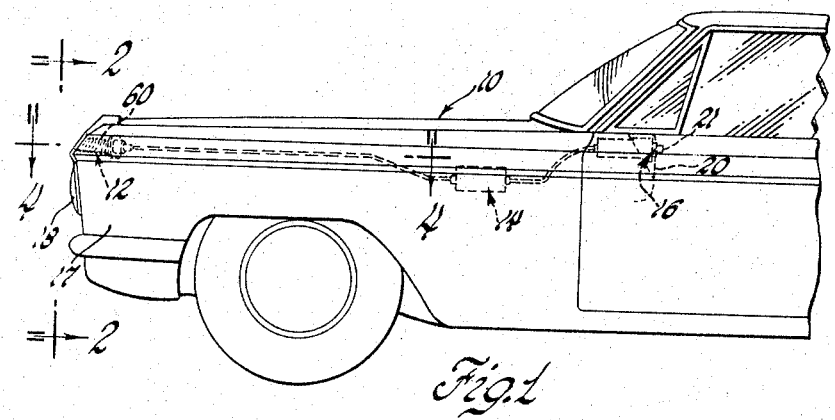
FIGURE 1 is a side elevational view of a motor vehicle showing the location of the components of the present invention.

Referring now to the drawings and initially to FIGURE 1, the components of the headlamp control system of the present invention are shown in dotted lines in their respective locations within a motor vehicle generally designated 10. The system comprises a phototube assembly generally designated 12, an amplifier assembly 14, and a driver sensitivity control assembly 16. The phototube assembly 12 is mounted in the left front fender 17 directly behind and slightly above the outboard headlamps 18. The amplifier assembly 14 is suitably mounted under the instrument panel 20. The driver sensitivity control assembly 16 is mounted on the instrument panel 20 and is combined with the standard headlamp switch 21 so as to be easily accessible to the driver.

Figure 4:
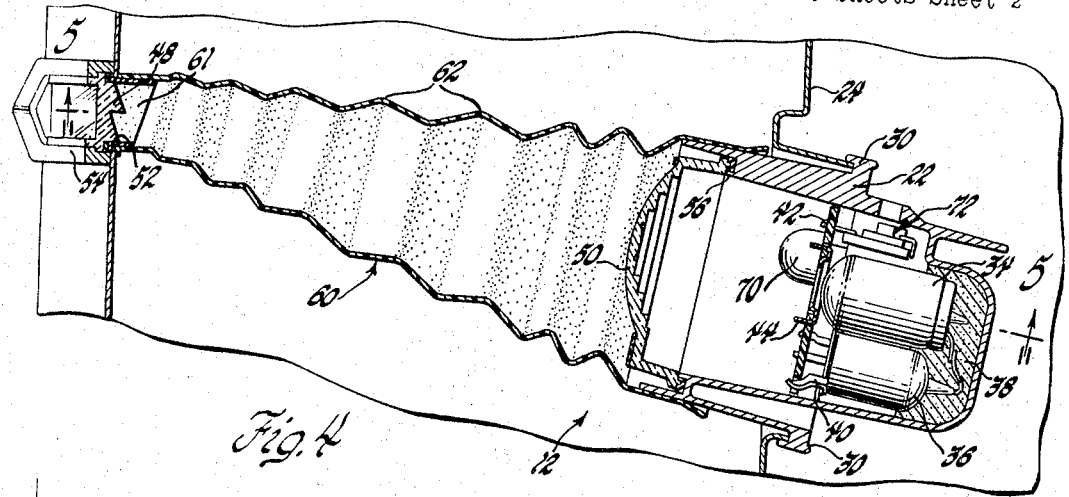
FIGURE 4 is an enlarged sectional view taken along lines 4—4 of FIGURE 1.
Figure 5:
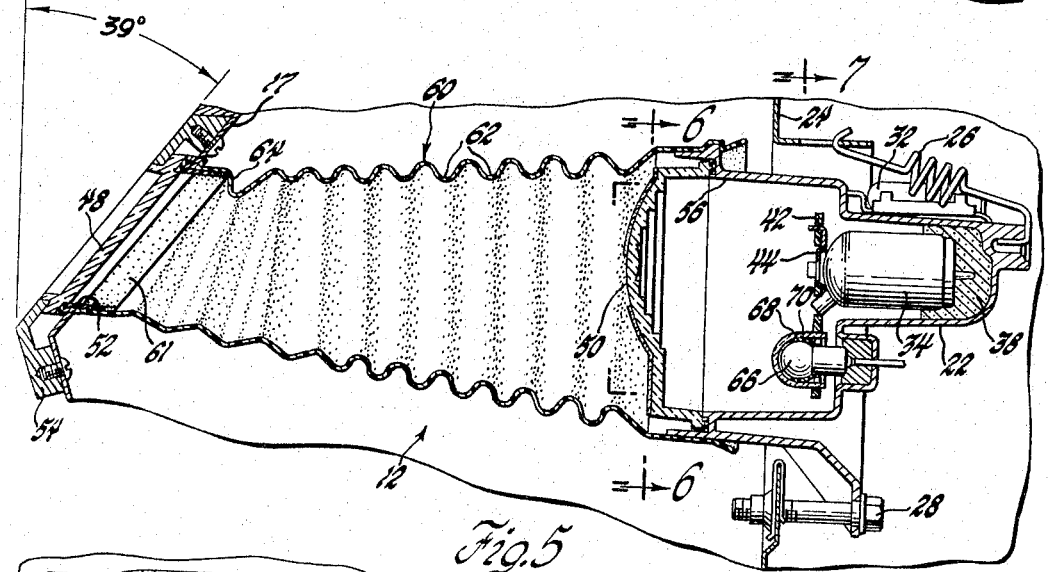
FIGURE 5 is a sectional view taken along lines 5—5 of FIGURE 4.
Figure 6:
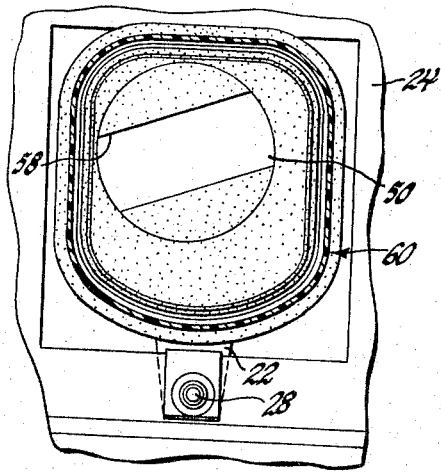
FIGURE 6 is a sectional view taken along lines 6—6 of FIGURE 5.
Figure 7:
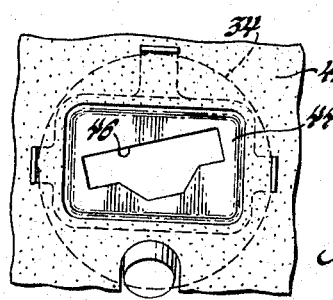
FIGURE 7 is an enlarged sectional view taken along lines 7—7 of FIGURE 5.

Referring now to FIGURES 4 and 5, the phototube assembly 12 comprises a diecast housing 22 supported in the left front fender dust shield plate 24 by a retainer spring 26 and an adjusting screw 28. The housing 22 is adapted for pivotal movement in a vertical plane about the journals 30 through adjustment of the screw 28. A level 32 is conveniently located on the housing 22 to indicate when the photo tube assembly 12 is properly aligned in the vertical plane. A photocell 34 and a preamplifier tube 36 are potted in a suitable material 38 to form a unit which is easily assembled within the housing 22. The terminals 40 of the preamplifier tube 36 are connected to a printed circuit board assembly 42 which is suitably mounted wihtin the housing 22 in front of the photocell 34. The printed circuit board assembly 42 eliminates all hand wiring of the phototube assembly 12 and improves the reliability thereof. A mask 44 is mounted in the printed circuit board 42 and as best shown in FIGURE 7 is provided with an irregular-shaped aperture 46. The aperture 46 provides the only opening for the transmission of light through the mask 44 to the photocell 34.

Figure 3:
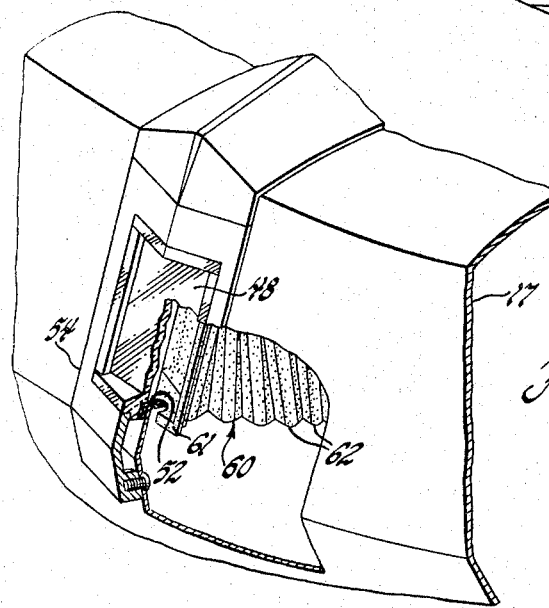
FIGURE 3 is a perspective view of a portion of the left front fender of a motor vehicle with parts broken away to show the mounting of the phototube assembly of the present invention.

The optical system of the present invention comprises an outer lens 48 and an inner lens 50. The outer lens 48 is mounted in a rectangular opening 52 provided in the left front fender 17 and is held in place by the bezel 54 which is suitably secured to the fender 17. The outer lens 48 may be formed of any suitable transparent material such as glass or Lucite plastic. The inner lens 50 is suitably secured to the housing 22 over the light transmitting aperture 56 in the housing 22. The inner lens 50 is suitably secured to the housing 22 over the light transmitting aperture 56 in the housing 22. As best shown in FIGURE 3, a polyethylene corrugated tube generally designated 60 provides a light tight and dust proof passageway for the transmission of light from the outer lens 48 to the inner lens 50. The tube 60 is suitably secured at one end to the housing 22 and presses against the inner surface of the fender 17 at its other end. A polystyrene insert 61 provides a smooth seating surface for the lens 48 on the outer surface of the fender 17 and extends into the tube 60 to form a dust proof seal around the opening 52. The inner surface of the inner lens 50 is stepped to reduce the lens section and the outer surface is painted opaque except for a narrow section 58. The narrow section 58 serves two purposes. First, it reduces the surface area of the lens 50 which would glow from extraneous light entering the tube 60. This surface glow would adversely affect the hold sensitivity. Second, by making the section 58 narrow in the vertical, it allows for possible misalignment in the vertical direction between the outer lens 48 and the inner lens 50. Light entering from the outer lens 48 falls as a narrow vertical strip of light on the inner lens 50. This vertical strip of light overlaps the exposed section 58 of the inner lens 50.

The tube 60 includes a plurality of corrugations 62. A light baffle 64 is provided by making the first corrugation behind the outer lens 48 and on the top side of the tube 60 deeper than the other corrugations. The light baffle 64 effectively eliminates unwanted system response from the motor vehicle's own headlights striking the road's surface and reflecting back into the phototube assembly 12. The light baffle 64 is an important feature of the present invention and is essential in order to obtain optimum performance of the system. For example if no light baffle is provided, reflected light from the road's surface would illuminate the top surface of the tube 60 and cause the front surface of the inner lens 50 to glow. This glow light on the inner lens 50 would at times be of a higher light level than the basic hold light level to which the system is adjusted. Thus, different color road surfaces could greatly affect the operation of the system. In fact on white surface roads, the system might be held on low beam at all times.

Figure 2:
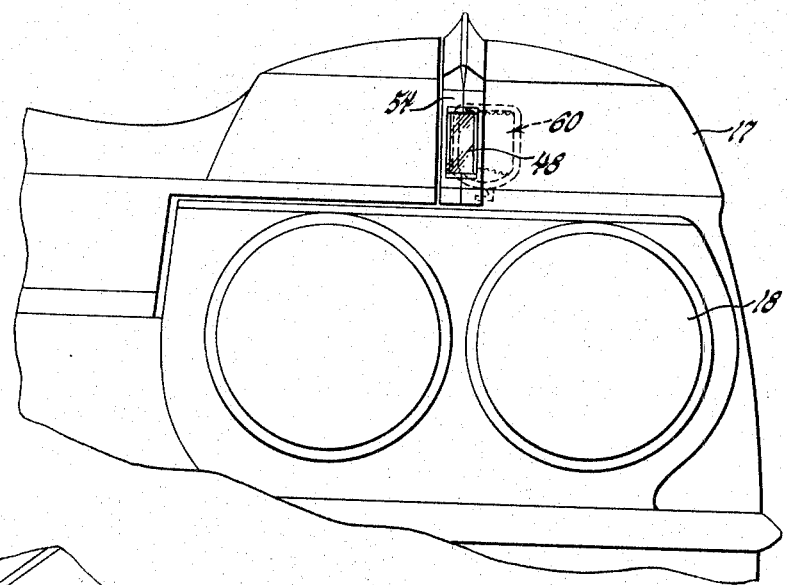
FIGURE 2 is an enlarged elevational view taken along lines 2—2 of FIGURE 1.

Referring now to FIGURES 2 and 4, it is apparent that the housing 22 is not directly behind the opening 52 but rather is located outboard thereof. In order to properly direct the light from oncoming vehicles to the photocell 34, the outer lens 48 is provided with a double prism arrangement which shifts the light approximately 11° so that the light will be directed to the inner lens 50 rather than reflected off of the inner surfaces of the tube 60. We have found that movement of a light source horizontally in front of the outer lens 48 does not produce a corresponding horizontal movement across the inner lens 50 but rather the light moves across the inner lens 50 at an angle of approximately 14° from the horizontal. For this reason, the section 58 and the aperture 46 are slanted at an angle of approximately 14° from the horizontal.

Figure 9:
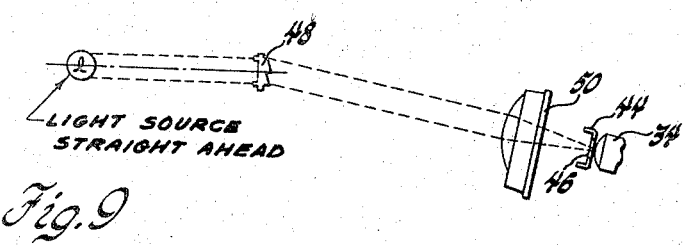
FIGURES 9, 10 and 11 illustrate diagrammatically the horizontal range over which the optical system is responsive.
Figure 10:
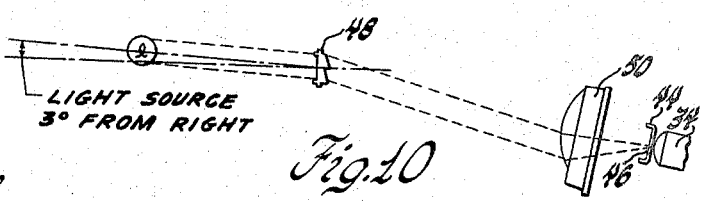
Figure 11:

The present system is responsive to light sources located within a range of 3° to the right and 7° to the left of the centerline of the motor vehicle. As shown in FIGURES 9, 10, and 11, light received within this horizontal range is shifted by the prisms and directed to the inner lens 50 where the light is condensed and focused on the photocell 34 through the aperture 46 formed in the mask 44. Light which emanates from a source outside of this 10° range will be blocked by the irregular-shaped aperture 46, thus preventing actuation of the system. The shape of the aperture 46 also determines the vertical acceptance angles of the optical system and in the present invention includes a range of approximately 3° above and 2° below the horizontal plane of the vehicle.

It will be apparent from FIGURES 1 and 5 that the outer lens 48 is positioned in the left front fender at an angle of 39° from the vertical. We have found that this particular location and angle is very desirable from the standpoint of preventing the accumulation of contaminants on the outer lens 48 which might affect the proper operation of the system. The outstanding results obtained through our extensive testing of the system leads us to believe that a vacuum is produced in the air flow about the fender which overcomes what has for some time appeared as a major drawback of exposing the light collector of a headlamp control system to the elements.

As indicated previously, the phototube assembly 12 is provided with a sensitivity test bulb 66 which is suitably mounted in the housing 22 and extends through an opening in the printed circuit board assembly 42. A vinyl shield 68 surrounds a portion of the bulb 66 and the entire bulb is enclosed by an opaque plastic filter 70 which allows transmission of approximately 1% of the light emanating from the bulb 66. The sensitivity of the system may be quickly checked and easily adjusted by applying predetermined "dim" and "hold" voltages to the sensitivity test bulb 66 and thereafter adjusting the driver sensitivity control assembly 16 until proper upper and lower beam switching occurs.

Figure 8:
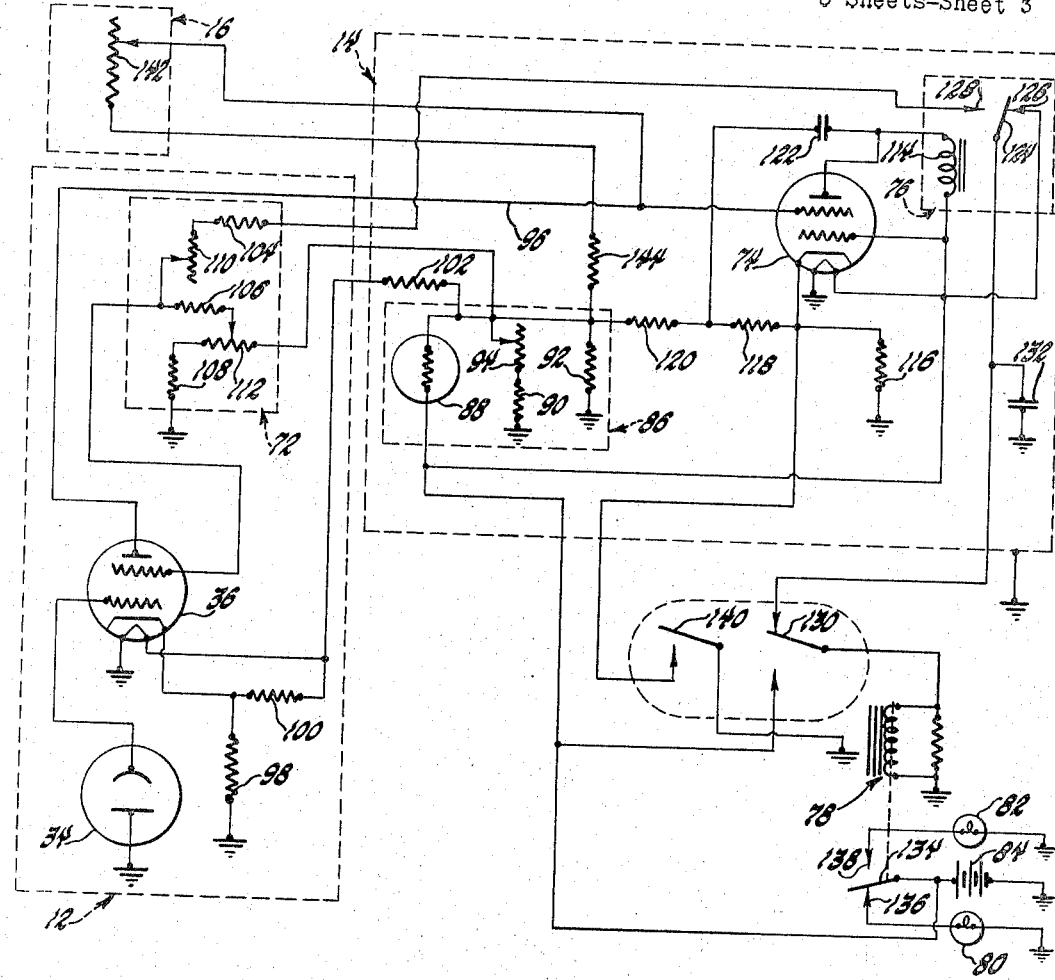
FIGURE 8 is a schematic diagram of the automatic headlamp control system of the present invention.

Referring now to the schematic diagram shown in FIGURE 8, the amplifier assembly 14 includes a current amplifier 74 which controls the energization of a control relay 76 in accordance with the signal voltage developed by the photocell 34 and the preamplifier tube 36. The control relay 76 controls the energization of a power relay 78 which in turn selectively connects the upper beam circuit 80 and the lower beam circuit 82 of the headlamp with a source of power such as a vehicle battery 84.

The preamplifier tube 36 and the current amplifier 74 are supplied with operating voltages from the battery 84 through a voltage regulator 86. The voltage regulator 86 comprises a ballast resistor 88, fixed resistors 90 and 92, and a variable resistor 94.

The photocell 34 has its cathode connected with the control grid of the preamplifier tube 36 and its anode connected to ground. The preamplifier 36 is a low plate potential electron tube and has its plate connected directly to the control grid of the current amplifier 74 through the conductor 96. The cathode of the preamplifier 36 is connected to ground through the fixed resistor 98 and through voltage dropping resistors 100 and 102 to the voltage regulator 86. Maintaining the cathode of the preamplifier 36 above ground potential improves the voltage regulation of the complete system and also makes the phototube assembly 12 less susceptible to interference from the vehicle's ignition system. The cathode heater filament of the preamplifier 36 is connected between ground and the junction of the voltage dropping resistors 100 and 102. The screen grid of the preamplifier 36 is connected to the sensitivity control unit 72 which comprises fixed resistors 104, 106, 108, a dim sensitivity control potentiometer 110 and a hold sensitivity control potentiometer 112. The potentiometer 112 is connected to the voltage regulator 86 and the potentiometer 110 is adapted to be connected into the circuit by the control relay 76 to provide the sensitivity of the system when the upper beam circuit has been energized.

The battery 84 is connected directly to the screen grid of the amplifier tube 74 and to the plate of the amplifier tube 74 through the energizing coil 114 of the control relay 76. The cathode of the amplifier tube 74 is connected to ground through the resistor 116 and to the voltage regulator 86 through resistors 118 and 120. A capacitor 122 is connected between the plate of the amplifier tube 74 and the junction between resistors 118 and 120 to provide a time delay on the dimming side of the system. This time delay is fully explained in Serial Number 171,850 assigned to the assignee of the present invention.

The control relay 76 includes a movable contact 124 which is normally in engagement with a stationary contact 126 and actuable by relay energization into engagement with a stationary contact 128. The movable contact 124 is connected to ground through a selector switch 130 and the power relay 78. The stationary contact 128 is connected with the potentiometer 112 as previously initmated. The stationary contact 126 is connected directly with the battery 84 and thus when the control relay 76 is deenergized, the dim sensitivity control potentiometer 112 is open circuited and the power relay 78 is energized. A capacitor 132 is connected between the contact 124 of the control relay 76 and ground to minimize the destructive effect of current interruption.

The power relay 78 includes the movable contact 134 which is normally in engagement with the stationary contact 136 and is connected directly to the battery 84 for energization of the upper beam circuit 80 when the power relay 78 is deenergized. When the power relay 78 is energized, the movable contact 134 engages the stationary contact 138 to energize the lower beam circuit 82. The system includes a manually actuable override switch 140 connected between the cathode of the amplifier 74 and ground to cause control relay 76 to be pulled in for selection of the upper beam circuit 80 at the will of the driver.

The selector switch 130 permits manual selection of the upper beam circuit 80 and disconnection of the automatic control system. In the position shown the selector switch 130 connects the power relay 78 to the control relay 76 to provide for automatic control. In the alternate position the selector switch 130 connects the energizing coil of the power relay 78 across the battery 84 and provides for manual selection of the lower beam circuit 82.

A driver sensitivity control assembly 16 comprises a non-linear rheostat 142 which forms the combined preamplifier tube plate resistor and the current amplifier control grid resistor. The sensitivity range provided by the rheostat 142 is from +400% to −85% whereas prior art systems utilizing a change in preamplifier cathode resistance were limited to a range of about +150% to −50%. A 10K ohm resistor 144 is in series with the rheostat 142 to prevent excessive current flow in the grid circuit of the amplifier 74 should the rheostat 142 be adjusted to zero resistance. If the rheostat 142 is adjusted to zero, the voltage drop across the resistor 144 even under bright light conditions would not be sufficient to stop conduction of the amplifier 74. The control relay 76 would therefore remain energized and the system would keep the headlamps on upper beams, thus as far as the driver is concerned, when the rheostat 142 is adjusted to zero the system is turned off and in order to attain lower beam, the foot switch must be depressed.

As indicated previously, one of the major drawbacks of the prior art automatic headlamp dimming systems was the necessity for matching the phototube assembly with the amplifier assembly in each system installation. This problem has been eliminated in the present invention by including the sensitivity control unit 72 in the phototube assembly rather than in the amplifier assembly. With this arrangement the phototube assembly can now be adjusted to a master amplifier and all amplifier assemblies can be adjusted to a master phototube assembly. When the phototube assembly and the amplifier assembly are connected together, any errors due to slight misadjustment of either unit or errors due to stack up of tolerances in the various components can be compensated for by adjusting the rheostat 142. Thus the driver sensitivity control assembly 16 serves not only as a sensitivity control for the driver but also as a means of adjusting out differences and tolerances between the pickup and control units.

The operation of the system is as follows. When there is a low value of light intensity impinging upon the photocell 34, it presents a very high resistance in the grid-to-cathode circuit of the preamplifier 36. Electrons accumulate on the control grid of the preamplifier 36 and maintain it as cutoff. The plate voltage of the preamplifier 36 is supplied to the control grid of the amplifier 74 and causes sufficient conduction to pull the control relay 76 which closes the movable contact 124 against the stationary contact 128. When the control relay 76 pulls in, the energizing circuit for the power relay 78 is interrupted and the movable contact 134 engages stationary contact 136 thus energizing the upper beam circuit 80.

Upon an increase of light intensity impinging photocell 34, it becomes more conductive and acts as a variable grid leak resistor permitting the control grid of the preamplifier 36 to become more positive. Consequently, preamplifier conduction increases and the plate voltage becomes less positive causing the conduction through amplifier 74 to decrease. At a predetermined value of light intensity determined by the setting of the dim sensitivity control potentiometer 110, the amplifier 74 will cease to conduct. The control relay 76, however, will not be deenergized until after the capacitor 122 has charged to battery voltage at which time the movable contact 124 engages the stationary contact 126 and connects the battery 84 across the energizing coil of the power relay 78. The movable contact 134 then engages the stationary contact 138 to energize the lower beam circuit 82. When the control relay 76 drops out it also interrupts the ground return circuit for the dim sensitivity control potentiometer 110. Thus the screen grid voltage in the preamplifier 36 becomes more positive and increases the sensitivity to permit the preamplifier 36 to maintain the current amplifier 74 cut off at a lower value of light intensity. Sensitivity of the system under this condition is determined by the setting of the hold sensitivity control potentiometer 112. The increase in sensitivity prevents instability or oscillation of the system when the headlamps of oncoming vehicles are switched to lower beam.

While we have described and illustrated a preferred embodiment of our invention, we wish it to be understood that we do not intend to be restricted solely thereto but intend to cover all modifications thereof which would be apparent to one skilled in the art and which come within the spirit and scope of our invention.

We claim:

1. In an automatic headlamp control system for a motor vehicle, a photube assembly comprising a housing mounted in a front fender of the vehicle, light responsive means mounted in said housing, an outer lens positioned in said fender to receive light from the headlamp of an approaching vehicle, an inner lens attached to said housing for receiving the light passing through the outer lens and focusing the light on said light responsive means, a light tight and dust proof enclosure connected between said inner and outer lenses and including light baffle means comprising an inwardly extending portion of said enclosure for excluding light reflected from the road surface in front of said vehicle.

2. In an automatic headlamp control system for a motor vehicle, a phototube assembly comprising a housing mounted in a front fender of said vehicle, light responsive means mounted in said housing, an outer lens positioned in said fender in front of and inboard of said housing for receiving light from a source, an inner lens attached to said housing, said outer lens including a double prism arrangement for directing the light to said inner lens, said inner lens adapted to focus the light on said light responsive means, a light tight and dust proof enclosure connected between said inner and outer lenses and including light baffle means for excluding light reflected from the road surface in front of said vehicle, a mask mounted in said housing and positioned in front of said light responsive means and including an irregular-shaped aperture for restricting the light reaching said light responsive means to light emanating from a source located within predetermined vertical and horizontal acceptance angles.

3. In an automatic headlamp control system for a motor vehicle, a phototube assembly comprising a housing pivotally mounted in the left front fender of said vehicle, a photocell and a preamplifier tube mounted in said housing, an outer lens positioned in said fender to receive light from a source, an inner lens attached to said housing and adapted to receive the light passing through the outer lens and to focus the light on said photocell, a light tight and dust proof enclosure connected between said inner and outer lenses and including light baffle means for excluding light reflected from the road surface in front of said vehicle, a level assembly mounted on said housing for vertically aligning said housing, a dim and hold sensitivity control assembly mounted in said phototube assembly and electrically connected with said preamplifier tube for adjusting the sensitivity thereof to a given light intensity impinging said photocell, a sensitivity test bulb mounted in said housing for providing said given light intensity.

4. In an automatic headlamp control system for a motor vehicle, a phototube assembly comprising a housing mounted in the left front fender of said vehicle, light responsive means mounted in said housing, an outer lens mounted in an opening in the left front fender and laying at a angle of 39° with the vertical, said housing mounted rearwardly of and outboard of said outer lens, said outer lens including a double prism arrangement for directing the light collected by the outer lens toward said housing, an inner lens attached to said housing and adapted to receive the light passing through the outer lens and to focus the light on said light responsive means, the outer surface of said inner lens being opaque except for a generally rectangular section, a mask mounted in said housing between said inner lens and said photocell and including an irregular-shaped aperture for restricting the light impinging said photocell to that emanating from a source located within predetermined vertical and horizontal acceptance angles, said rectangular section and said aperture being slanted at an angle of approximately 14° with the horizontal.

5. In an automatic headlamp control system for a motor vehicle, a phototube assembly comprising a housing mounted in the left front fender of the vehicle, light responsive means mounted in said housing, an outer lens positioned in said fender inboard of said housing and at an angle of 39° from the vertical and including a double prism on the inside face thereof, an inner lens attached to said housing for receiving the light passing through the outer lens and focusing the light on said light responsive means, the outer surface of said inner lens being opaque except for a narrow section extending thereacross, a flxible light tight and dust proof enclosure connecting said inner and outer lenses and including a plurality of corrugations extending inwardly from the surface of said enclosure, the first corrugation behind said outer lens and in the upper surface of said enclosure adapted to exclude light reflected from the road surface in front of said vehicle, a shield mounted in said housing and including an irregular-shaped aperture for limiting the light falling on said light responsive element to that approaching said assembly within a vertical range of approximately 5° and from within a horizontal range of approximately 10°.

6. An automatic control system for vehicle headlamps comprising upper and lower beam circuits, a source of electrical power, relay means connected to said source for selectively energizing the upper or lower beam circuit, a first electron tube for controlling the energization of said relay means and including a cathode, a plate, a control grid, and a screen grid, a second electron tube including a plate, a cathode, a control grid and a screen grid, a light responsive device connected between the control grid and the cathode of said second tube, variable resistance means connected between said source and the screen grid of said second tube for varying the sensitivity of the second tube dependent upon the energization of said relay means, means connecting the plate of said second tube to the control grid of said first tube and variable resistance means connected between said source and said means for varying the voltage at the control grid of said first tube.

7. An automatic control system for vehicle headlamps comprising upper and lower beam circuits, a source of electrical power, relay means connected to said source for selectively energizing the upper or lower beam circuit, a first electron tube for controlling the energization of said relay means and including a plate, a cathode, a control grid, and a screen grid, a second electron tube including a plate, a cathode, a control grid, and screen grid, voltage regulating means connected between said source and said tube, a light responsive device connected between the control grid and the cathode of said second tube for controlling the signal voltage output of said second tube in accordance with the intensity of the light impinging said light responsive device, first and second potentiometers connected between said voltage regulator and the screen grid of said second tube for varying the voltage applied thereto depending upon the energization of said relay means, means connecting the plate of said second tube to the control grid of said first tube, a rheostat and a fixed resistor connected between said voltage regulator and said means for varying the voltage at the control grid of said first tube.

References Cited by the Examiner

UNITED STATES PATENTS

| 2,480,425 | 1/1948 | Simmon | 250—237 X |
| 2,848,651 | 8/1958 | Byrne | 315—83 |
| 2,850,674 | 9/1958 | Atkins | 315—83 |
| 2,884,564 | 4/1959 | McIlvaine | 250—239 X |
| 2,912,593 | 11/1959 | Deuth | 315—83.1 |
| 3,026,446 | 3/1962 | Martin et al. | 315—83.1 |
| 3,177,397 | 4/1965 | Keeran | 315—83 |

FOREIGN PATENTS

| 866,465 | 4/1961 | Great Britain. |

JAMES W. LAWRENCE, *Primary Examiner.*

S. A. SCHNEEBERGER, *Assistant Examiner.*